July 28, 1925.  
E. G. WEAVER  
LOCK NUT  
Filed April 14, 1925  
1,547,983
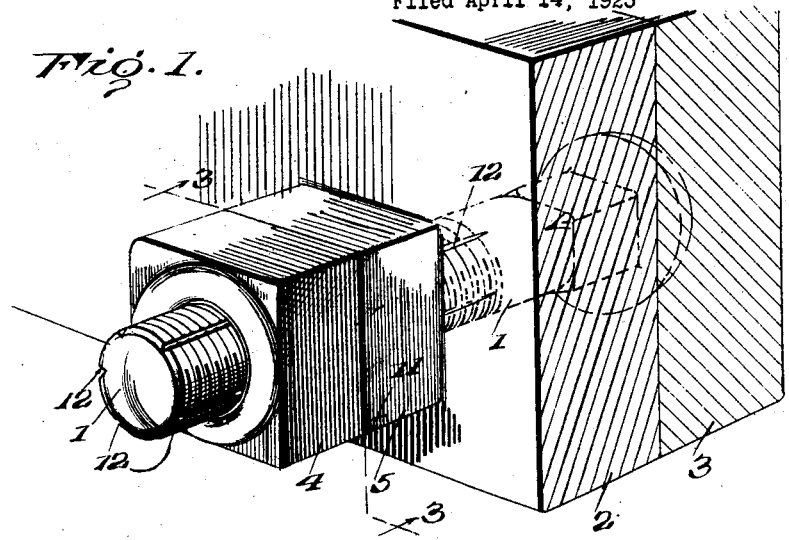
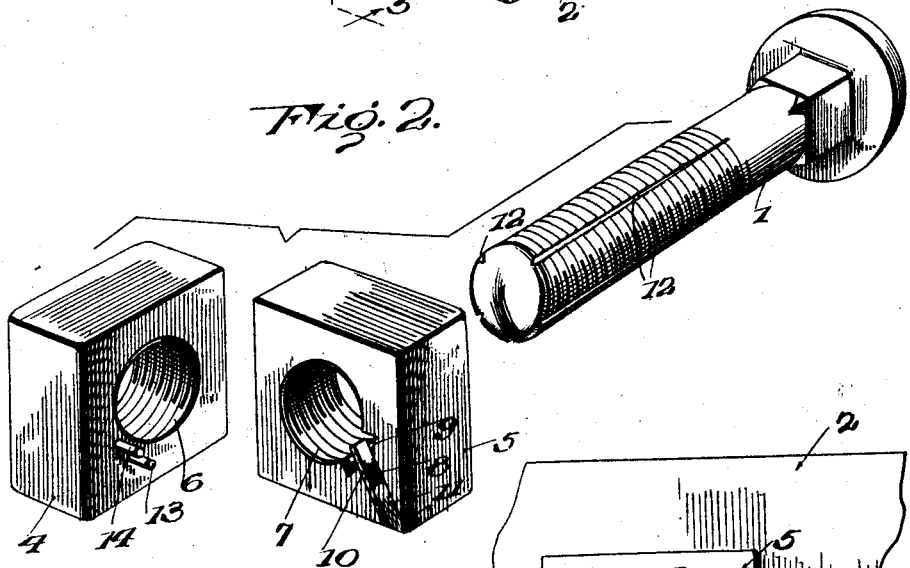
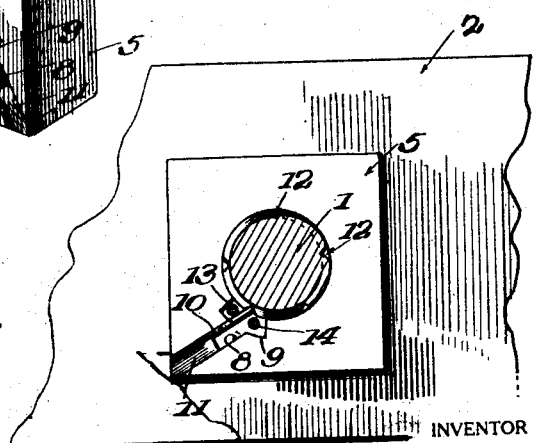
INVENTOR  
Edward G. Weaver.  
BY  
ATTORNEYS Patented July 28, 1925.

1,547,983

UNITED STATES PATENT OFFICE.

EDWARD G. WEAVER, OF BUTTE, MONTANA.

LOCK NUT.

Application filed April 14, 1925. Serial No. 23,073.

*To all whom it may concern:*

Be it known that I, EDWARD G. WEAVER, a citizen of the United States, and a resident of Butte, in the county of Silver Bow and State of Montana, have made certain new and useful Improvements in Lock Nuts, of which the following is a specification.

My invention relates to improvements in lock nuts, and it consists in the combinations, constructions and arrangements herein described and claimed.

An object of the invention is to provide an efficient lock nut which has facilities for engaging with the shank of a bolt to lock the nut firmly, although releasably, against retrograde movement on the bolt shank without any interference with the turning of the nut on the bolt shank toward the head of the bolt.

A further object of the invention is the provision of a lock nut which is reliable in use, easy to manipulate and thoroughly practical commercially.

Other objects and advantages of the invention will be apparent from the following description considered in conjunction with the accompanying drawing, in which:—

Figure 1 is a perspective view of a lock nut and bolt construction embodying the invention;

Figure 2 is a perspective group view of the lock nut and the bolt, the lock nut being detached from the bolt and the sections of the lock nut being separated from each other, and, Figure 3 is a transverse section through the bolt along a plane extending between the sections of the lock nut.

In Figure 1 I show a bolt having a shank 1 extended through alined openings in two juxtaposed members 2 and 3, respectively, which are to be secured together by means of the bolt 1 and a nut which is screwed on the bolt. The nut embodying the invention for cooperating with the bolt is shown as comprising two sections 4 and 5, respectively, each provided with a screw threaded bore for engaging with the threaded bolt shank, the bore of the section 4 being indicated at 6 and the bore of the section 5 being designated 7. The section 5 is the inner section and is provided with a radial recess 8 in its outer face. This recess 8 is in the form of a channel which is enlarged laterally in opposite directions at its juncture with the bore 7 as indicated at 9, for a purpose to be presently stated. A flat spring member 10 is disposed in the recess 8 in position to extend through the enlarged portion 9 of the recess a slight distance into the bore 7, the spring 10 being secured at its outer end against movement in the recess 8 by means of a plug 11 so that the inner end of the spring member 10 can be flexed laterally in the enlargement 9 of the recess 8.

With the arrangement described so far, the section 5 can be placed in threaded engagement with the shank of the bolt, the inner end of the spring member 10 being flexed laterally in the enlarged portion 9 of the recess in the section 8 to permit the bolt shank to extend through the bore of the section 5, the inherent resiliency of the spring member then causing frictional contact of the inner end of the spring member 10 with the threaded peripheral wall of the bolt shank. The spring member 10 therefore constitutes a spring friction latch and tends to hold the section 5 against retrograde movement on the shank of the bolt without any appreciable retardation of the turning movement of the section 5 to advance the section toward the head of the bolt. The bolt shank preferably is provided with a plurality of longitudinally extending grooves 12 in its peripheral wall and it is manifest that the inner end of the spring latch member 10 will engage these grooves 12 in turn as the section 5 is turned on the bolt shank, and when in engagement with any one of the grooves 12, will positively hold the section 5 against retrograde movement from that position on the bolt shank until the inner end portion of the spring latch 10 has been moved out of engagement with the groove 12.

The section 4 of the lock nut has means adapted to enter the enlarged portion 9 of the recess in the outer face of the section 5 and to cooperate with the section 5 and with the spring latch member 10 to transmit motion between the sections 4 and 5 and to swing the inner end portion of the spring latch member 10 to position to release the bolt shank when the section 4 is turned retrogressively on the bolt shank. Such means comprises a pair of spaced rigid pin-like projections 13 and 14 respectively, extending from the inner face of the section 4 into the enlarged portion 9 of the cavity in the outer face of the section 5 when the sections 4 and 5 are placed flatwise against each other with the bores thereof alined and are screwed as a unit on to the bolt shank. The projections 13 and 14 straddle the inner end portion of the spring latch member 10.

From the foregoing description of the various parts of the device, the operation thereof may be readily understood. The outer faces of the sections of the lock nut are non-circular in cross-sectional contour and are adapted to be gripped between the jaws of a wrench or like. The lock nut preferably is advanced on the bolt shank by turning the sections 4 and 5 as a unit, although it is obvious that turning of either of the sections 4 and 5 will cause turning of both the sections on the bolt shank toward the bolt head since motion will be transmitted between the sections of the nut through one of the projections 13 and 14, one of which will be moved against a side wall of the enlarged portion 9 of the cavity in the outer face of the section 5 when an attempt is made to turn one of the sections 4 or 5 on the bolt shank without applying a torque to the other section. The spring latch member 10 will frictionally engage at its inner end with the bolt shank, but of course will not prevent turning of the nut on the bolt shank toward the head of the nut. However, the engagement of the inner end of the spring latch member 10 with the bolt shank will tend to prevent retrograde movement of the nut on the bolt shank and when the spring latch member is in engagement with one of the grooves 12, will positively prevent retrograde movement of the lock nut upon the bolt shank. Accidental loosening of the nut from a desirable position on the bolt shank therefore will be precluded.

When it is desired to loosen the nut, a torque is applied to the outer section of the nut, tending to move the nut on the bolt shank toward the outer end of the bolt shank. When this power is first applied to the section 4, the latter will move relatively to the section 5 until the projection 13 shall have engaged the inner end portion of the spring latch member 10, and shall have moved the latter out of position to engage one of the grooves 12. At this time the projection 14 will have moved against the adjacent wall of the enlarged portion 9 of the cavity in the outer face of the section 5 and thereafter the sections 4 and 5 will move as a unit on the shank of the bolt and can be detached from the bolt or moved rearwardly on the bolt shank to any desirable position.

Obviously, the invention is susceptible of embodiment in forms other than that which is illustrated in the accompanying drawing and I therefore consider as my own all such modifications and adaptations thereof as fairly fall within the scope of the appended claims.

I claim:—

1. A lock nut comprising a pair of cooperative sections, each formed with a threaded bore for engagement with the shank of a bolt, one of said sections having a recess in the face thereof which is proximate to the other section, a spring latch member secured in said recess with the inner end portion of the latch in position to contact frictionally with the bolt shank and to tend to hold said one section against retrograde movement on the bolt shank, and a pair of spaced projections extending from the second section into said recess in straddling relation to said spring latch for transmitting motion between said sections and for moving said spring latch out of engagement with said bolt shank when said second section is moved retrogressively on the bolt shank.

2. A lock nut comprising a pair of cooperative sections, each formed with a threaded bore for engagement with the shank of a bolt, one of said sections having a recess in the face thereof which is proximate to the other section, a spring latch member secured in said recess with the inner end portion of the latch in position to contact frictionally with the bolt shank and to tend to hold said one section against retrograde movement on the bolt shank, and a pair of spaced projections rigid with the second section and extending from the second section into the recess in the first section in position to straddle the inner end portion of said spring latch, one of said projections being adapted to engage with the inner end portion of said spring latch to move the latter out of engagement with said bolt shank when said second section is moved retrogressively on the bolt shank and the other of said projections being adapted to engage at that time with a side wall of said recess to transmit motion from the second section to the first section of the lock nut.

3. A lock nut comprising a pair of cooperative sections, each formed with a threaded bore for engagement with the shank of a bolt, one of said sections having a recess in the face thereof which is proximate to the other section, a spring latch member secured in said recess with the inner end portion of the latch in position to contact frictionally with the bolt shank and to tend to hold said one section against retrograde movement on the bolt shank, a pair of spaced projections extending from the second section into said recess in straddling relation to said spring latch for transmitting motion between said sections and for moving said spring latch out of engagement with said bolt shank when said second sections is moved retrogressively on the bolt shank, said bolt shank having a longitudinal groove in its peripheral surface for engagement with the inner end portion of said spring latch.

4. A lock nut comprising a pair of sections adapted to be placed in threaded engagement with a bolt shank, locking means carried by one of said sections for engaging with the bolt shank to hold said one section against retrograde movement on the bolt shank without interfering with turning of said section in the opposite direction on the bolt shank, and motion transmitting means connecting said sections to turn as a unit in a forward direction on the bolt head and operable when a torque is applied to the second section tending to move said second section retrogressively on the bolt shank to first render said locking means ineffective to hold said first section against retrograde movement on the bolt shank, and then to turn said sections retrogressively on the bolt shank.

EDWARD G. WEAVER.